United States Patent [19]

Kaufman

[11] Patent Number: 4,492,498

[45] Date of Patent: Jan. 8, 1985

[54] DRILL BIT JIG

[76] Inventor: Emery M. Kaufman, R.R. 1, 1699 E.B. Rd., Bremen, Ind. 46506

[21] Appl. No.: 409,125

[22] Filed: Aug. 18, 1982

[51] Int. Cl.³ .............................................. B23B 47/28
[52] U.S. Cl. .................................. 408/115 R; 408/97; 408/72 R
[58] Field of Search ..................... 408/72 R, 102, 103, 408/108, 112, 115 R, 109, 97

[56] References Cited

U.S. PATENT DOCUMENTS

| | | | |
|---|---|---|---|
| 200,598 | 2/1878 | Barnes et al. | 408/103 |
| 1,072,328 | 9/1913 | Goodrich | 408/115 R |
| 2,342,033 | 2/1944 | Barabas | 408/115 X |
| 2,778,251 | 1/1957 | Gunas | 408/104 |
| 2,849,900 | 9/1958 | Heidtman | 408/112 |
| 3,019,675 | 2/1962 | Cleveland | 408/115 X |
| 3,086,408 | 4/1963 | Donals | 408/115 R |
| 3,327,573 | 6/1967 | Prussiano | 408/115 |
| 3,465,620 | 9/1969 | Hilburn | 408/115 R |
| 3,534,639 | 10/1970 | Treichler | 408/115 |
| 3,626,513 | 12/1971 | Pytlak | 408/115 |
| 4,153,384 | 5/1979 | Isaken | 408/115 R X |
| 4,199,283 | 4/1980 | Perry | 408/115 R |
| 4,331,411 | 5/1982 | Kessinger | 408/115 R X |

FOREIGN PATENT DOCUMENTS

| | | | |
|---|---|---|---|
| 1016376 | 11/1952 | France | 408/115 |
| 232680 | 6/1944 | Switzerland | 408/115 |
| 22264 | of 1896 | United Kingdom | 408/115 |
| 999270 | 7/1965 | United Kingdom | 408/115 |

Primary Examiner—William R. Briggs
Assistant Examiner—Glenn L. Webb
Attorney, Agent, or Firm—James D. Hall

[57] ABSTRACT

A jig which is for guiding a drill bit into a workpiece and which includes opposed end plates and jaw members for clamping the workpiece. A guide template is mounted between the end plates to travel in an arcuate path relative to the jaw members.

4 Claims, 7 Drawing Figures

DRILL BIT JIG

SUMMARY OF THE INVENTION

This invention relates to a jig for guiding a drill bit into a workpiece and may have specific application to positioning a drill bit for drilling dowel holes in beveled edges and mitered ends of workpieces.

Presently, in the joining of sides of a cabinet or other pieces of furniture a problem has been encountered when the sides are to be beveled at their end edges and fitted flush. Aligned holes must be drilled for dowel pins and glue in the beveled edges of the workpieces. Placement of such holes for the dowels is not always consistent which leads to uneven corners or corners where one side extends beyond the adjacent side.

The present invention includes end plates which define the body of the jig. Jaws are carried by the end plates and are used to clamp a workpiece into the jig. A drill template is mounted at its ends to each end plate to slide in an arcuate path which allows a drill bit to be guided into a workpiece at various selected angles.

As the drill template is shifted between drilling positions the vertical distance between the drill bit and the lower workpiece clamping jaw increases. Thus, when a beveled or mitered edge or end of a workpiece is placed within the clamping jaws, the drill template may be shifted to rest flush on the beveled or mitered edge with the drill bit being positioned to enter the edge at a location where drilling will not mar an outer or decorative surface. Also, since the drill template moves from the same reference, or lower position for each workpiece, the placement of the drill bit on the beveled or mitered surface is the same distance from a reference surface for workpieces of different thicknesses. This allows the fitting together of workpieces to form smoother and better aligned corners. The jig of the this invention may also be used to guide a drill into a workpiece having a flat edge.

Accordingly, it is an object of this invention to provide a novel and useful jig for guiding a drill bit into the edge of a workpiece.

Another object of this invention is to provide a jig which includes jaws for clamping a workpiece and an arcuately shiftable template positioned adjacent to the jaws.

Another object of this invention is to provide a jig which includes an arcuately shiftable template for placing a drill bit at a desirable position on a workpiece.

Another object of this invention is to provide a jig which will consistently position a drill bit on the edge of a workpiece at a desired distance from the outer surface of the workpiece to permit the easy and quick joining of workpieces of different thicknesses.

Other objects of this invention will become apparent upon a reading of the following description.

DESCRIPTION OF THE PREFERRED EMBODIMENT

Figure 1:
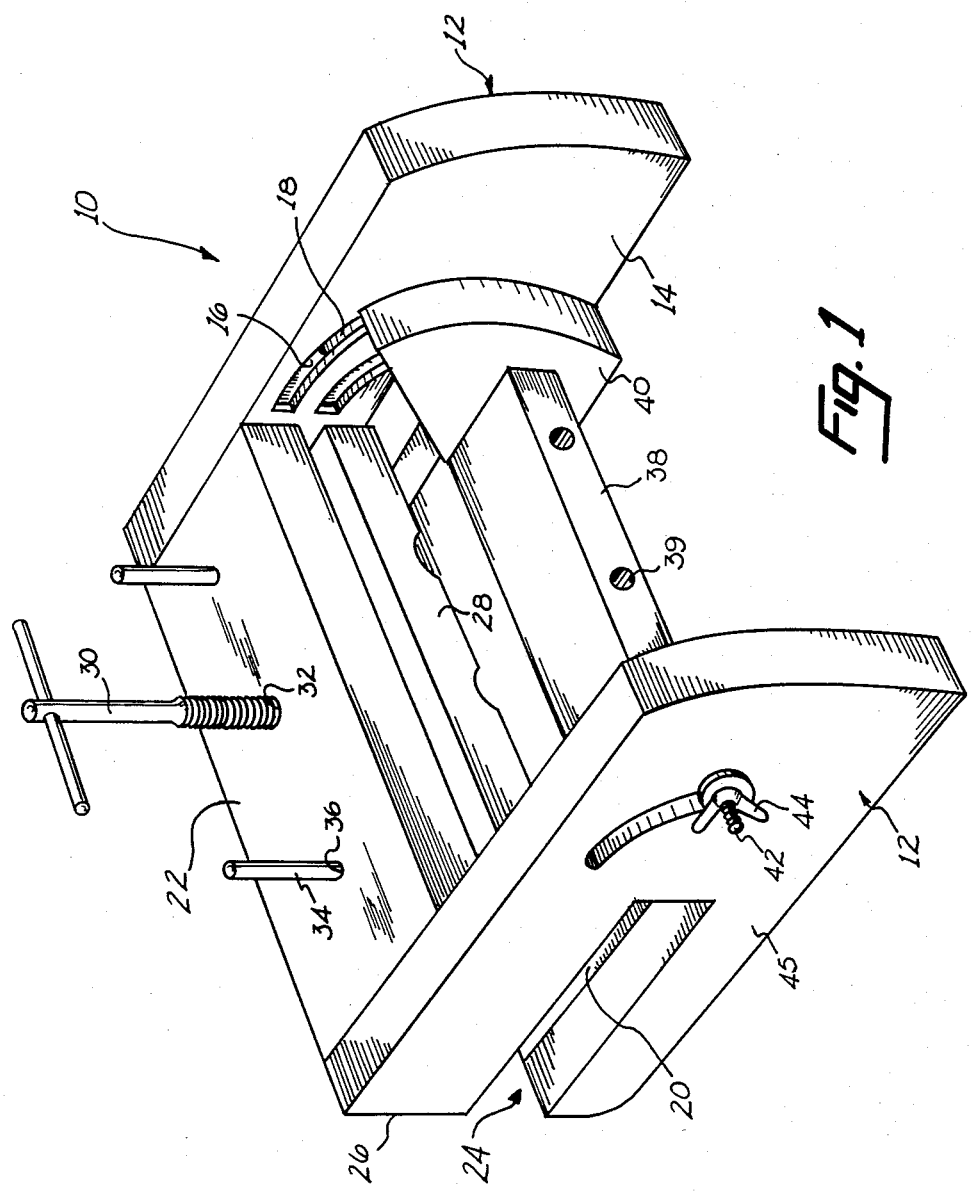
FIG. 1 is a perspective view of the jig of the invention.
Figure 3:
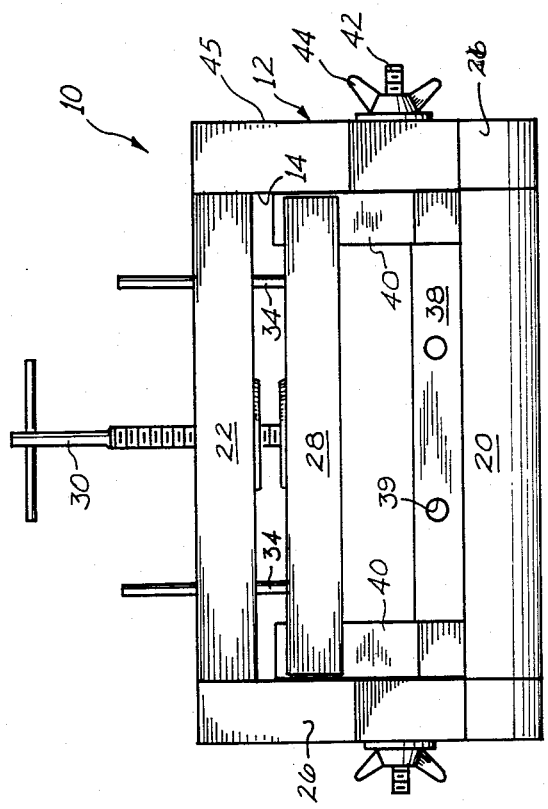
FIG. 3 is a rear view of the jig.
Figure 2:
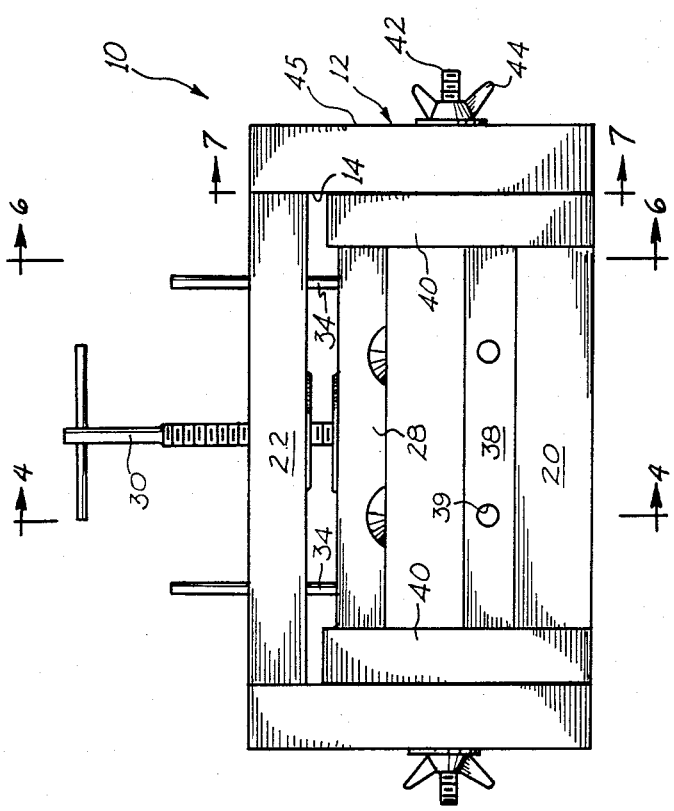
FIG. 2 is a front view of the jig.

The preferred embodiment illustrated is not intended to be exhaustive or to limit the invention to the precise form disclosed. It is chosen and described in order to explain the invention and its application and practical use to thereby enable others skilled in the art to utilize the invention.

The jig 10 of this invention includes end plates 12 which have opposed inner side faces 14. Arcuate grooves 16 are formed in each inner side face 14. A slot 18 through each end plate 12 is formed in one of grooves 16 in each side face 14. End plates 12 are joined by lower and upper cross members 20 and 22 respectively which are attached at their ends to each inner side face 14. An open ended slot 24 is formed in the end edge 26 of each end plate 12 between members 20 and 22. Upper cross member 22 carries a press plate 28 which is shiftable relative to lower cross member 20 as a result of rotation of a screw 30 threaded through an opening 32 in the upper cross member. Two guide rods 34 for press plate 28 are attached to the press plate and extend through openings 36 in upper cross member 22. Cross member 20 and press plate 28 constitute jaws for clamping a workpiece 15, as seen in broken lines in FIGS. 4 and 5.

Figure 7:
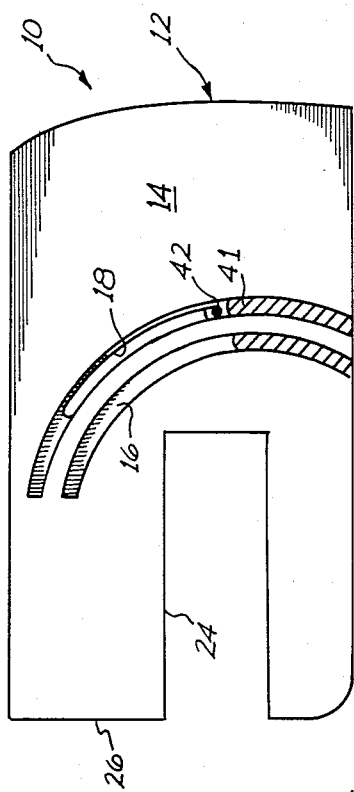
FIG. 7 is a sectional view of the jig taken along line 7—7 of FIG. 2.
Figure 6:
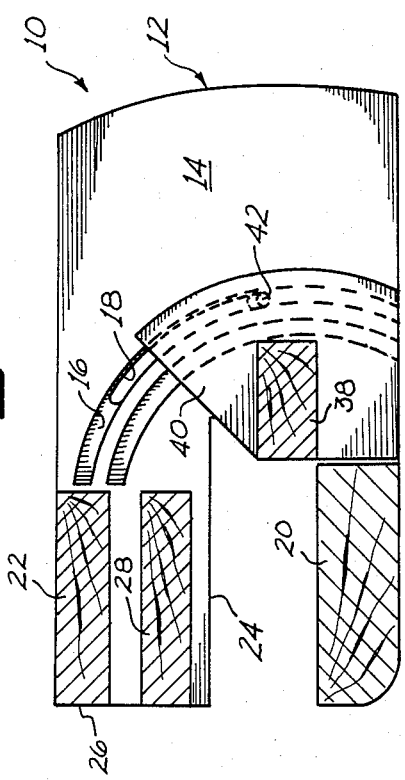
FIG. 6 is a sectional view of the jig taken along line 6—6 of FIG. 2.
Figure 4:
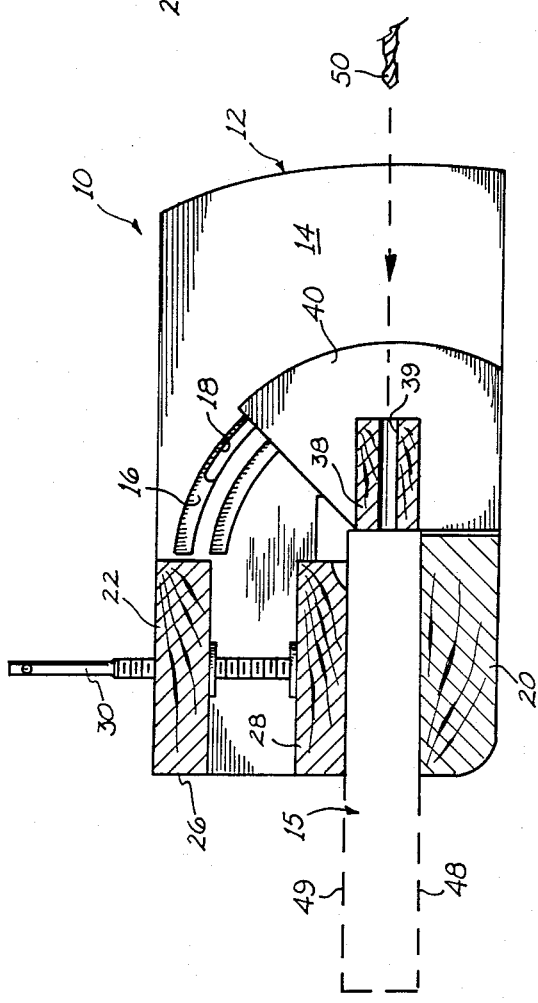
FIG. 4 is a sectional view of the jig taken along line 4—4 of FIG. 2 showing the jig applied to a workpiece.
Figure 5:
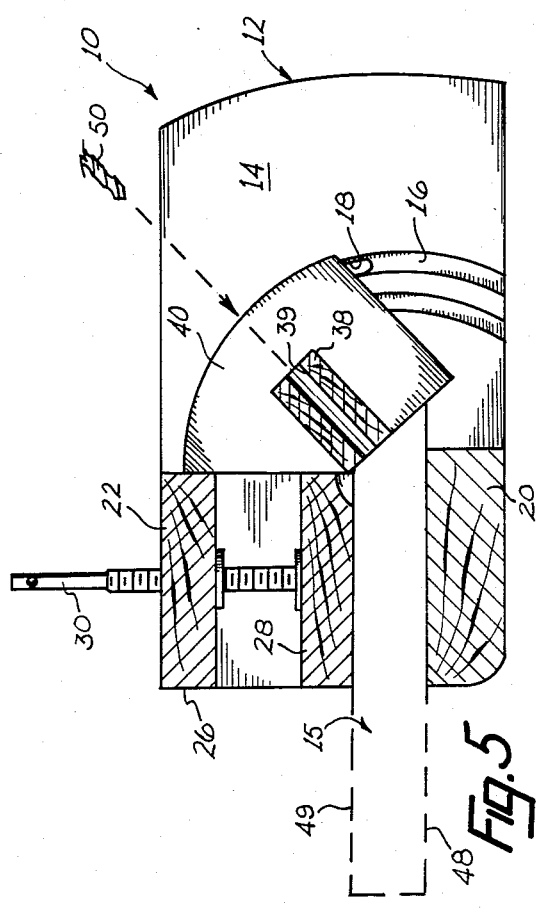
FIG. 5 is a sectional view of the jig showing the jig applied to a workpiece having a beveled edge.

A drill template or guide 38 extends lengthwise between end plates 12 and is carried by mounts 40. Mounts 40 have arcuate ribs 41 which fit into arcuate grooves 16 in the end plates as shown in FIG. 7 to permit shifting the template through an arc into different selected angular positions relative to cross member 20. Threaded pins 42 carried at one end by mounts 40 extend through slots 18 in the end plates and receive wing nuts 44 or other fastening devices at the other end which tighten against the outer side faces 45 of the end plates for locking drill guide 38 into a chosen angular position along end plate grooves 16. Drill guide 38 is positioned adjacent the jaw area created by lower cross member 20 and press plate 28 to contact the edge of a workpiece 15 as the workpiece is clamped by the jaws as shown in FIGS. 4 and 5.

In use, a workpiece 15 is placed between press plate 28 and lower cross member 20. Wing nuts 44 are loosened so that drill guide 38 may be shifted along grooves 16 in the end plates and the workpiece moved to allow the drill guide to rest flush against the edge of workpiece 15 to be drilled. When workpiece 15 and drill guide 38 are so positioned, screw 30 is rotated to lower press plate 28 for clamping jig 10 onto the workpiece. Wing nuts 44 are then tightened to lock the drill guide into position. As drill guide 38 is shifted through its arc from the horizontal position to a 45° position shown, the position of the drill bit 50 within guide holes 39 of the template is changed with respect to lower cross member 20 to increase its vertical distance from the lower cross member. In this fashion, for example, a workpiece having a 45° beveled edge as shown in FIG. 5 is drilled closer to its upper side face 49 for dowels or other devices than it is to its lower side face 48 due to the effect of raising the position of the drill bit from lower cross member 20. In this manner a hole can be drilled into the edge of the workpiece in a position where drilling to the required depth will not disfigure the lower side face 48 of the workpiece.

It is to be understood that the invention is not to be limited by the terms of the above description, but may be modified within the scope of the appended claims.

I claim:

1. An adjustable jig for guiding the bit of a drill into a workpiece, said jig comprising end plates having opposed inner faces, guide means for directing said drill bit extending between said end plate inner faces, clamp means carried between said end plates and opposed to said guide means for retaining said workpiece adjacent said guide means, slide means associated with said end plates and said guide means at each end thereof for selectively moving the guide means toward and away from the clamp means, wherein said guide means may be shifted through said slide means to butt against said work piece to guide said drill bit into the work piece, said slide means defining arcuate grooves formed in one of said guide means and said end plates and further defining arcuate ribs carried by the other of said guide means and said end plates which interfit into said grooves for guiding said guide means in an arcuate path relative to said clamp means.

2. The jig of claim 1 and means for securing said guide means in a selected position along said arcuate path.

3. The jig of claim 1 wherein said slide means includes a slot formed in at least one of said end plates, a threaded pin extending from said guide means through said slot, and a threaded fastener means for fitting threadably onto said pin and bearing against said one end plate at its outer surface for securing said guide means in a preselected position.

4. An adjustable jig for guiding the bit of a drill into a workpiece, said jig comprising end plates having opposed inner faces, guide means for directing said drill bit extending between said end plate inner faces, clamp means carried between said end plates and opposed to said guide means for retaining said workpiece adjacent said guide means, slide means associated with said end plates and said guide means at each end thereof for selectively moving the guide means toward and away from the clamp means, wherein said guide means may be shifted through said slide means to butt against said work piece to guide said drill bit into the work piece, each said end plate having open-ended slot means formed in one end face thereof spaced from said slide means for receiving and positioning said work piece adjacent said guide means, said clamp means positioned adjacent said slot means for holding said work piece in said slot means and in abutment with said guide means.

* * * * *